US011095568B2

(12) United States Patent
Finkelstein

(10) Patent No.: US 11,095,568 B2
(45) Date of Patent: Aug. 17, 2021

(54) SYSTEMS AND METHODS FOR NETWORK SCHEDULING AND RE-TRANSMISSION BUFFERING

(71) Applicant: Jeffrey Finkelstein, Atlanta, GA (US)

(72) Inventor: Jeffrey Finkelstein, Atlanta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 16/181,844

(22) Filed: Nov. 6, 2018

(65) Prior Publication Data
US 2020/0145345 A1    May 7, 2020

(51) Int. Cl.
| | | |
|---|---|---|
| *H04L 12/26* | (2006.01) | |
| *H04L 12/863* | (2013.01) | |
| *H04L 12/869* | (2013.01) | |
| *H04L 12/867* | (2013.01) | |
| *H04L 12/875* | (2013.01) | |

(52) U.S. Cl.
CPC ........ *H04L 47/6295* (2013.01); *H04L 47/564* (2013.01); *H04L 47/60* (2013.01); *H04L 47/629* (2013.01)

(58) Field of Classification Search
None
See application file for complete search history.

(56) References Cited

U.S. PATENT DOCUMENTS

| | | | | |
|---|---|---|---|---|
| 6,292,484 B1* | 9/2001 | Oliver | ............... | H04L 12/64 370/389 |
| 6,556,561 B1* | 4/2003 | Himbeault | ......... | H04L 12/4015 370/352 |
| 2003/0189943 A1* | 10/2003 | Gorti | .............. | H04L 47/10 370/412 |
| 2005/0232154 A1* | 10/2005 | Bang | ............... | H04L 49/9078 370/235 |
| 2010/0074275 A1* | 3/2010 | Sahai | ............... | H04L 12/2856 370/468 |

* cited by examiner

*Primary Examiner* — Zewdu A Beyen
(74) *Attorney, Agent, or Firm* — Eversheds Sutherland (US) LLP

(57) ABSTRACT

Described herein include systems, methods, and apparatuses for the scheduling of data over a network (e.g., a wired or wireless network). A scheduler may be configured to receive a portion of packets at a receiving buffer and classify the packets into real time packets or non-real time packets using associated first and second queues. Further, a first re-transmission component may receive the real time packets from the first queue, and a second re-transmission component may receive the non-real time packets from the second queue. The real time packets may be received, by a transmission component, from the first re-transmission component; the transmission component may also receive non-real time packets from the second re-transmission component. The scheduler may then transmit at least one real time packet or non-real time packet to another device over a network using any suitable scheduling algorithm.

13 Claims, 7 Drawing Sheets

SYSTEMS AND METHODS FOR NETWORK SCHEDULING AND RE-TRANSMISSION BUFFERING

BACKGROUND

A variety of service providers, such as cable providers and satellite providers, may connect user devices to one or more networks, such as cable networks and/or the Internet. A provider may provide cable and/or Internet access to a residence via devices such as headend devices that includes a computer system and databases required for the provisioning of content. The headend may include cable modem termination system (CMTS), which can send and receives cable modem signals on a cable network, for example, to provide Internet services to cable subscribers. However, the residence may experience issues such as congestion, speed losses, pricing spikes, service interruptions, and the like which can degrade the user experience.

BRIEF DESCRIPTION OF THE DRAWINGS

Reference will now be made to the accompanying drawings, which may not necessarily be drawn to scale, and wherein.

DETAILED DESCRIPTION OF VARIOUS EMBODIMENTS

Figure 1:
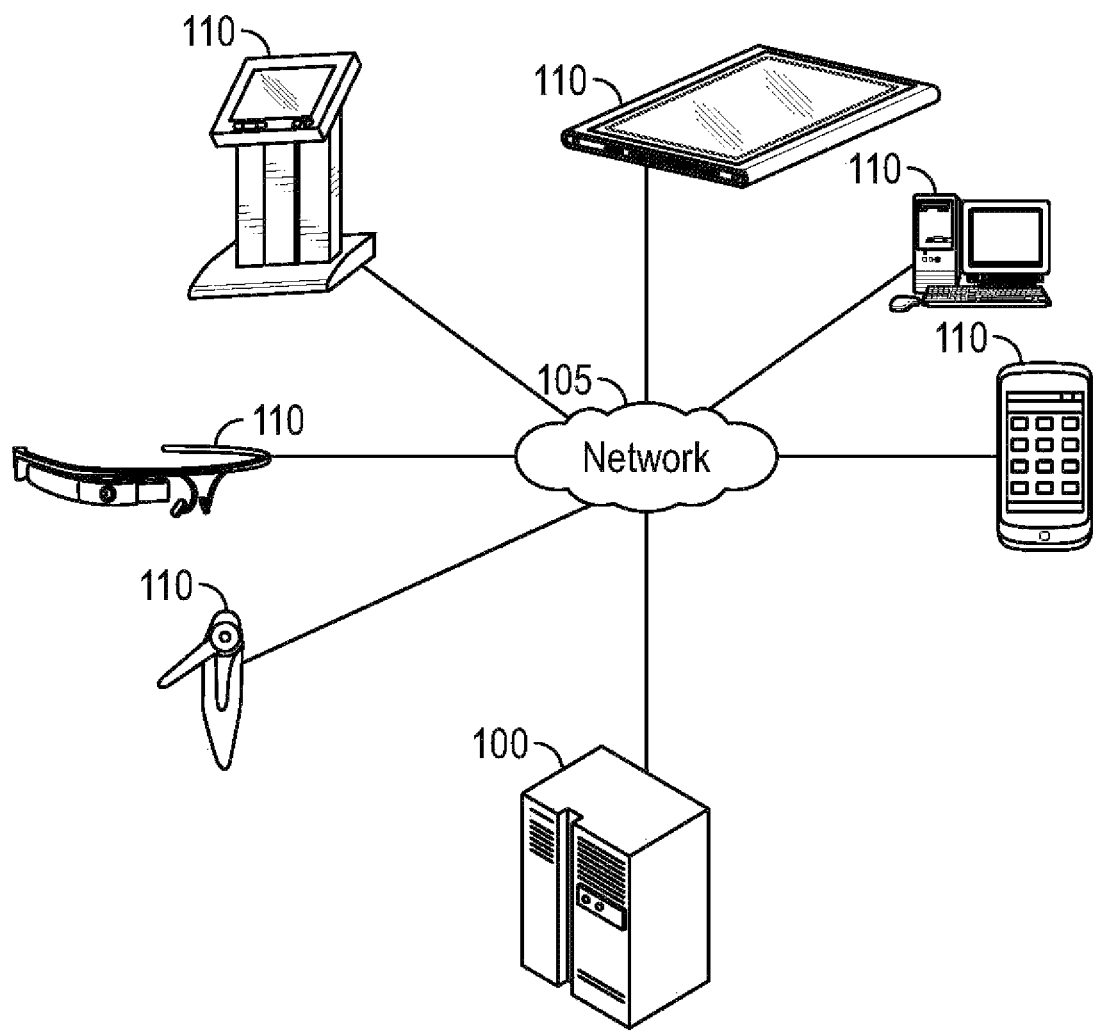
FIG. 1 shows an example schematic diagram of a system that can be used to practice embodiments of the present disclosure.

The details of one or more embodiments of the subject matter described herein are set forth in the accompanying drawings and the description below. Other features, aspects, and advantages of the subject matter will become apparent from the description, the drawings, and the claims.

In various embodiments, described herein include systems, methods, and apparatuses for the scheduling of data over a network (e.g., a wired or wireless network). In another aspect, a scheduler (e.g., a network scheduler) may be configured to receive a portion of packets at a receiving buffer in computer memory. Moreover, the scheduler may be configured to classify the packets into real time packets or non-real time packets and organize the packets into corresponding first and second queues (e.g., a first real time queue and a second non-real time queue). Further, a first re-transmission component may be configured to receive the real time packets from the first queue, and a second re-transmission component may be configured to receive the non-real time packets from the second queue. Further, the real time packets may be received, by a transmission component, from the first re-transmission component, and the transmission component may also receive non-real time packets from the second re-transmission component. The scheduler may then be configured to transmit at least one real time packet or non-real time packet to another device (e.g., a downstream cable modem) over a network using any suitable scheduling algorithm (e.g., round-robin, weighted fair queue, and the like).

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

I. COMPUTER PROGRAM PRODUCTS, METHODS, AND COMPUTING ENTITIES

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXAMPLE SYSTEM ARCHITECTURE

FIG. 1 provides an illustration of an example embodiment of the present disclosure. As shown in FIG. 1, this particular embodiment may include one or more management computing entities 100, one or more networks 105, and one or more user devices 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

In various aspects, the management computing entities 100 may include various devices on a cable network, including, but not limited to, switches, MAC devices, PHY devices, amplifiers, fiber nodes, access points (APs) and the like, variously described below. In another aspect, such devices may include circuitry (e.g., processors and memory) and associated software instructions (e.g., computer code) to perform various functions associated with such devices (e.g., transmit packets, receive packets, process packets, sort packets, schedule packets, provide status updates, download and install software updates, etc.). Moreover, such management computing entities 100 may perform aspects of the buffering and queuing of data packets described herein (e.g., at least with respect to FIGS. 4-8, below).

In another aspect, the networks 105 may include, but not be limited to, cable networks including hybrid fiber-coaxial networks. More broadly, the networks 105 may include at least portions of wireless networks or wired networks. In another aspect, a cable network may use various sub-networks (e.g., WiFi networks, cellular networks) to perform aspects of the functionality described herein, for example, in connection with the disclosed devices (e.g., switches, MAC devices, CMTS devices, PHY devices, amplifiers, fiber nodes, access points, and the like).

In another aspect, the user devices 110 may include, but not be limited to, devices associated with a customer premise equipment (e.g., devices located in the home of a user or on the person of a user). Non-limiting examples may include, but not be limited to, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

1. EXAMPLE MANAGEMENT COMPUTING ENTITY

Figure 2:
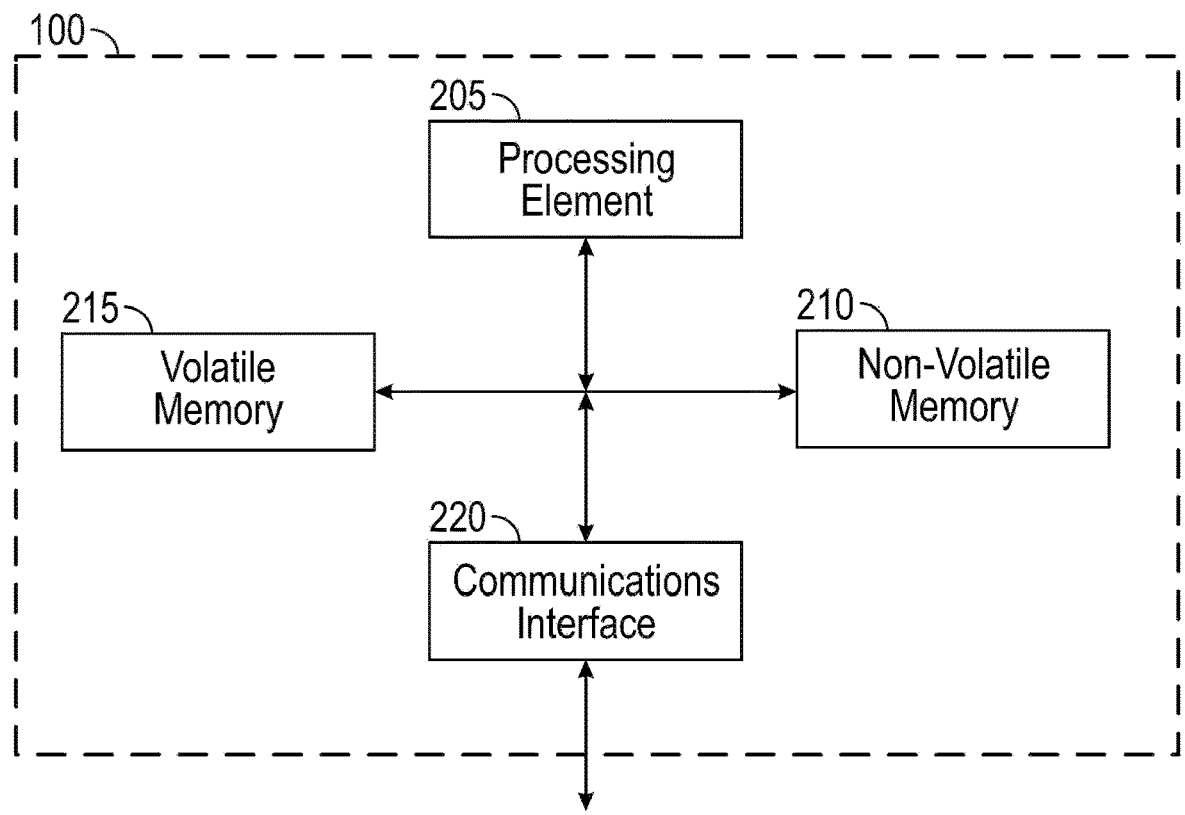
FIG. 2 shows an example schematic diagram of a management computing entity, in accordance with example embodiments of the disclosure.

FIG. 2 provides a schematic of a management computing entity 100 according to one embodiment of the present disclosure. As noted above, a management computing entity 100 may include various devices on a cable network, including, but not limited to, switches, MAC devices, access point devices, PHY devices, amplifiers, fiber nodes, and the like.

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user devices 110 and/or a variety of other computing entities.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for example purposes only and are not limiting to the various embodiments.

2. EXAMPLE USER DEVICE

A user may be an individual, a family, a company, an organization, an entity, a department within an organization, a representative of an organization and/or person, and/or the like. In one example, users may be employees, residents, customers, and/or the like. For instance, a user may operate a user device 110 that includes one or more components that are functionally similar to those of the management computing entity 100. In some aspects, user devices 110 may include, but not be limited to, devices associated with a customer premise equipment, as described above. In another aspect, the user device 110 may be configured to receive data from an access point or other similar device (e.g., at a customer premise equipment site such as a home).

Figure 3:
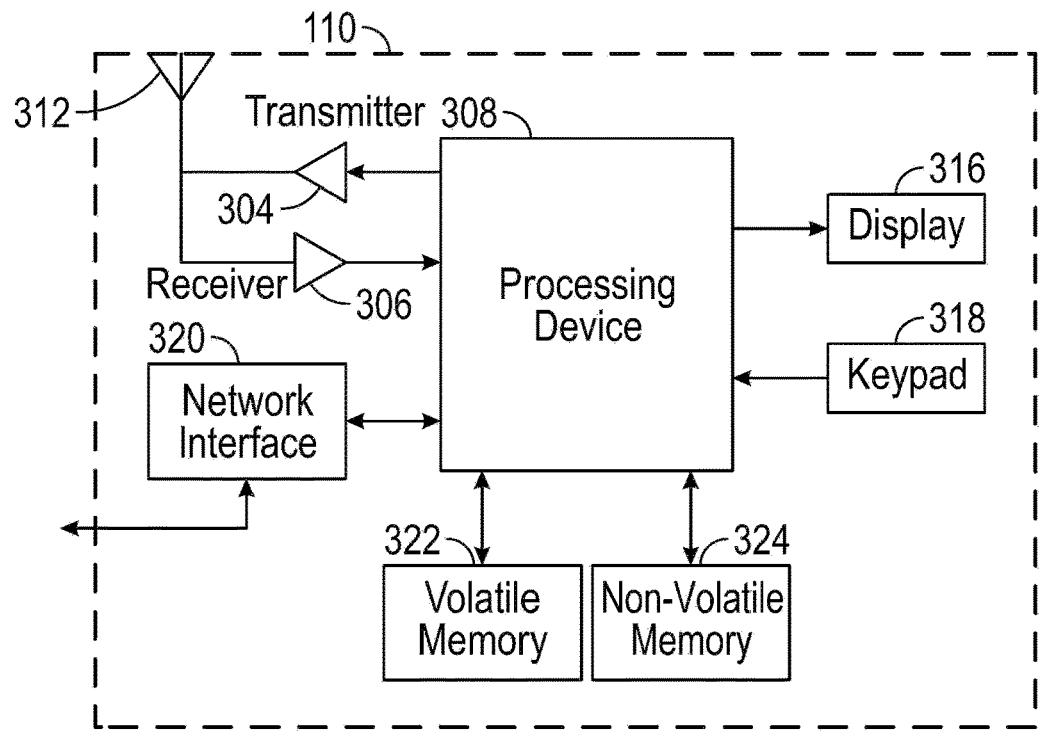
FIG. 3 shows an example schematic diagram of a user device, in accordance with example embodiments of the disclosure.

FIG. 3 provides an illustrative schematic representative of a user device 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 110 can be operated by various parties. As shown in FIG. 3, the user device 110 can include an antenna 312, a transmitter 304 (for example radio), a receiver 306 (for example radio), and a processing element 308 (for example CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the management computing entity 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 110 may operate in accordance with multiple wired communication standards and protocols, such as those described above with regard to the management computing entity 100 via a network interface 320.

Via these communication standards and protocols, the user device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (for example including executable instructions, applications, program modules), and operating system.

According to one embodiment, the user device 110 may include location determining aspects, devices, modules, functionalities, and/or similar words used herein interchangeably. For example, the user device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 110 position in connection with a variety of other systems, including cellular towers, Wi-Fi access points, and/or the like. Similarly, the user device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user device 110 to interact with and/or cause display of information from the management computing entity 100, as described herein. The user input interface can comprise any of a number of devices or interfaces allowing the user device 110 to receive data, such as a keypad 318 (hard or soft), a touch display, voice/speech or motion interfaces, or other input devices. In embodiments including a keypad 318, the keypad 318 can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the management computing entity 100 and/or various other computing entities.

In another embodiment, the user device 110 may include one or more components or functionality that are the same or similar to those of the management computing entity 100, as described in greater detail above. As will be recognized, these architectures and descriptions are provided for example purposes only and are not limiting to the various embodiments.

III. EXAMPLE SYSTEM OPERATION

In some embodiments, disclosure describes systems, methods, and apparatus that describe a scheduler that can schedule real data time packets and non-real time data packets over a network. In one embodiment, the network may include one or more different forms of transmission mechanisms and associated underlying media (e.g., fiber, coax, wireless such as Wi-Fi or cellular). In some embodiments, the scheduler may use priority assignments for the transmission of the different types of data packets. That is, a prioritization determination module (for example, a module implemented at least partially in software using computer code and/or implemented at least partially in hardware using one or more circuits) may label data packets with differential transmission priorities (e.g., using data over cable service interface specification (DOCSIS) priorities, ethernet priorities, or the like). For example, a data packet may be labeled with a given numeral (e.g., a priority "8") to indicate a real time priority level and transmitted immediately upon the availability of system resource, while another data packet may be labeled with a different numeral (e.g., a priority "0") to indicate that it may be transmitting using a less time-sensitive method (e.g., a best effort method or similar technique). In another aspect, the scheduler may use other example priority labels, for example, labels that indicate whether the data packet may need to be sent using a short forwarding technique or using an expedited forwarding technique. In another aspect, the scheduler may be implemented in in connection with or as a part of the functionality of the management computing entity 100, described above.

In some embodiments, the disclosure describes a more granular prioritization of data and a more efficient buffer and queue management by a scheduler in various devices on a network, as compared with conventional technologies. Further, the disclosure describes additional methods and systems that enable the scheduler to not discard packets based on the packets' priority level, unless the packets are marked discard eligible. Such added functionality may be useful in many applications, because it may be undesirable to discard higher priority packets, particularly for latency-sensitive applications such as gaming, robotics, vehicle-to-vehicle communication, remote medical care, and the like.

As noted, in various aspects, the scheduler may operate on data packets over a network independent of the network's underlying transmission medium (e.g., wireless or wired). Moreover, different transmission media (e.g., a wireless medium such as WiFi) may have a corresponding scheduler that may be optimized for that particular medium and for related devices and protocols. Such medium-specific schedulers (e.g., WiFi schedulers) may use specific scheduling algorithms for packet transmission, for example, a weighted fair queue technique or a round-robin technique, which may be non-deterministic (e.g., not probabilistic) in nature and therefore, limited in their ability to send information rapidly under extreme data congestion conditions.

As noted, in some embodiments, the disclosure describes a universal scheduler that can work with transmitting and receiving devices that may use any type of network or medium. In some aspects, the disclosed scheduler may work with the DOCSIS media access layer (MAC) and may provide coordinated and associated functionality with the DOCSIS MAC. Moreover, in some embodiments, the disclosed scheduler may replace existing schedulers and/or modules having scheduling capability that may already exist in for other media (e.g., cellular, WiFi, etc.), for example, by sending control messages to disable portions of the existing scheduler and replacing aspects of the functionality of the existing scheduler with aspects the disclosed scheduler.

In some embodiments, such a scheduler may implement active queue management (e.g., proportional integral enhanced active queue management, PIE) as used and described in connection with some cable standards (e.g., DOCSIS). Further, the scheduler may extend aspects of active queue management and associated scheduling capabilities to devices on networks that are not cable networks.

In another aspect, the disclosed scheduler can provide a data packet scheduling functionality that may work independent of the underlying medium technology to operate on networks that operate using a split MAC and/or physical layer (PHY) architecture (e.g., networks where the functionality of the MAC and a functionality of the PHY is separated (e.g., virtually separated or physically separated). In some embodiments, the scheduler may operate in a split MAC architecture. That is, the scheduler may operate in a network where the MAC layer is separated into an upper MAC layer and a lower MAC layer. Moreover, in such a split MAC architecture, the upper half of the MAC layer may be used for operating the scheduler, in addition to providing quality of service functionality, data packet tagging functionality, and data packet preparation for transmission. Accordingly, the disclosure enables the separation of the upper MAC (e.g., to perform scheduling, quality of service, prioritization, etc.) and the lower MAC layer (e.g., to handle preparing the data for transmission by transmitting the data from the MAC layer to the PHY layer).

In some embodiments, the DOCSIS specification referenced herein may enable the deployment of data-over-cable systems on a nonproprietary, multi-vendor, interoperable basis for bidirectional transfer of Internet Protocol (IP) traffic between a cable system headend and customer equipment over an all-coaxial or hybrid-fiber/coax (HFC) cable network. In another embodiment, hybrid fiber-coaxial (HFC) can refer to a broadband network that combines optical fiber and coaxial cable. In some aspects, the system can include a CMTS or access controller node located at the headend, a coaxial or HFC medium, and cable modems (CMs) located at the premises of the customer, in conjunction with DOCSIS-defined layers that support interoperability features. In some aspects, the CMTS or access controller node can refer to a piece of equipment, for example, equipment located in a cable company's headend or hubsite, which can be used to provide data services, such as cable Internet or Voice over Internet Protocol (VoIP). In some aspects, the CMTS or access controller node can include aspects of the functionality of the management computing entity 100, described above.

Figure 4:
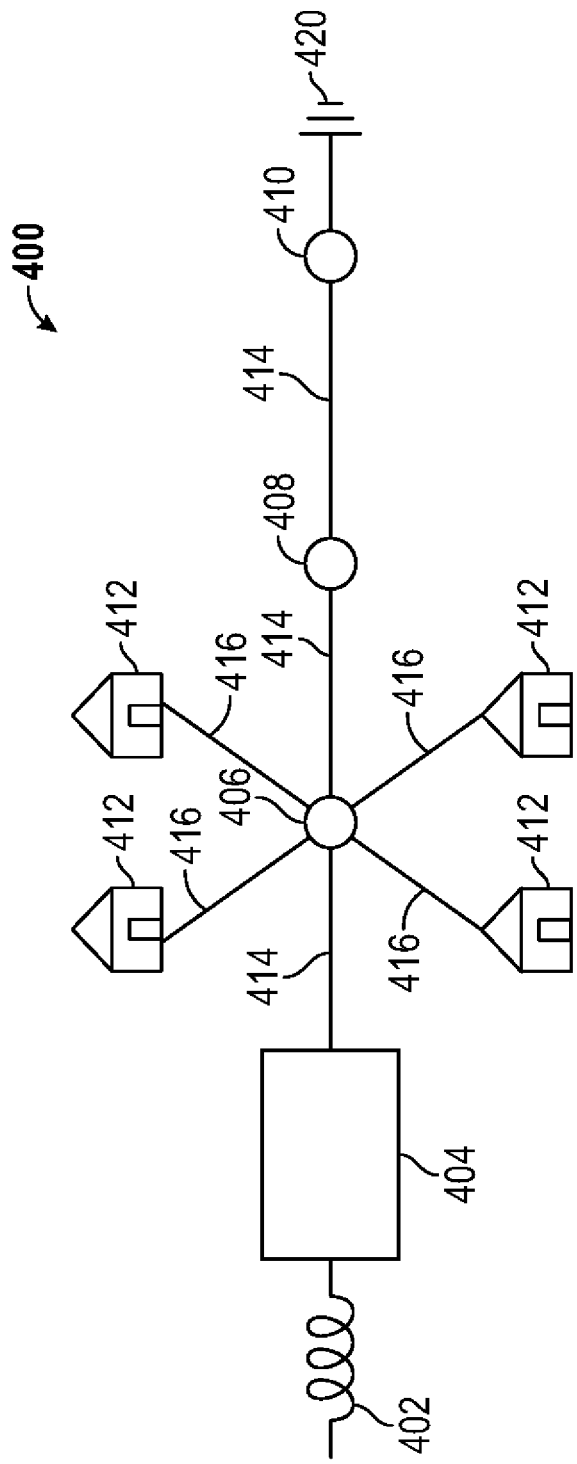
FIG. 4 shows an example diagram of a portion of a cable network and associated devices in a particular network deployment, in accordance with example embodiments of the disclosure.

FIG. 4 shows an example diagram 400 of a portion of a cable network and associated devices in a particular network deployment, in accordance with example embodiments of the disclosure. In various embodiments, the scheduler described herein may be used in connection with the network and associated devices depicted in diagram 400, as described further below. In some aspects, the cable network described herein can be implemented using a DOCSIS specification. In an embodiment, there can be a device 404, which may implement aspects of the scheduling functionality described herein. The device 404 can include a CMTS, which can also be referred to as an access controller, a controller, and/or a node herein. In an embodiment, the device can have a converged cable access platform (CCAP) functionality. In another embodiment, the device 404 can serve as remote physical (PHY) device, that is, a device having PHY layer functionality (that is, PHY layer functionality as described in connection with the open systems interconnection model, OSI model).

In an embodiment, there can be a fiber 414 connected to the device 404 and another fiber 402 that connects the device 404 to the upstream network (not shown); the device 404 can further be connected to various network cable taps 406, 408, and 410, also referred to as taps or terminations herein, and can connect to various cable modem (CM) devices, for example, at various households 412.

In some embodiments, a cable network can include a fiber optic network, which can extend from the cable operators' headend out to a neighborhood's hubsite, and finally to a coaxial cable node which serves customers, for example, 25 to 2000 households.

In an embodiment, data can be transmitted downstream from the device 404 to one or more devices (which may implement aspects of the scheduling functionality described herein) at homes 412 over drop cables (also referred to as drops herein) 416 using one or more taps 406, 408, and 410, and having a common ground 420. In an embodiment, as the data is transmitted downstream from the device 404 to one or more homes 412, the taps 412 can potentially generate various impairments on the network. Alternatively or additionally, as the signals pass through from the device 404 to the taps 406, 408, and 410 over fibers 414 and to the homes 412 over one or more drops 416, the fibers 414 and/or the drops 416 can cause the signals to undergo various impairments, for example, to the power spectral density of the signals. In an embodiment, the impairment can be due to attenuation on the fibers 414 and/or drops 416. In an embodiment, the impairments can lead to frequency distortions on the signals; for example, the higher frequency end of the signals may be attenuated. Accordingly, in an embodiment, one or more amplifiers (not shown) can be used to perform a gain on the attenuated signals. In an embodiment, the one or more amplifiers can be placed, for example, at one or more of the taps 406, 408, and 410 to perform the gain on the attenuated signals.

In some aspects, the cable network as described above can include a regional or area headend/hub. The hub can receive programming that is encoded, modulated and upconverted onto radio frequency (RF) carriers, combined onto a single electrical signal and inserted into a broadband transmitter, for example, an optical transmitter. In some embodiments, the transmitter can convert the electrical signal to a downstream modulated signal that is sent to the nodes. Fiber optic cables connect the headend or hub to nodes in various topologies, including, but not limited to, point-to-point or star topologies, ring topologies, and the like.

By using frequency-division multiplexing, an HFC network such as the one described in connection with FIG. 4 may carry a variety of services, for example, analog and digital TV, video on demand, telephony, data, and the like. Services on these systems can be carried on radio frequency (RF) signals in particular regions of the available spectrum.

The HFC network can be operated bi-directionally such that signals are carried in both directions on the same network. For example, the signals can be transmitted from the headend/hub office to the customer, and from the customer to the headend/hub office. In one aspect, a forward-path or downstream signals can refer to information from the headend/hub office to the customer. In another aspect, a return-path or upstream signals can refer to information from the customer to the headend/hub office. The forward-path and the return-path can be carried over the same coaxial cable in both directions between the node and the customer equipment.

In various aspects, the device 404 (e.g., CMTS device) and/or the network cable taps 406, 408, and 410 may include aspects of the functionality of the management computing entity 100, as shown and described in connection with FIGS. 1-2, above. In particular, the device 404 (e.g., CMTS device)

and/or the network cable taps 406, 408, and 410 may include or be in communication with one or more processing elements 205, memory 210, volatile memory 215, and may include a communication interface 220 (e.g., to communicate with between each other and with various customer premise equipment such as cable modems).

Moreover, the homes 412 may include customer premise equipment may include devices that include aspects of the functionality of the user device 110, as further shown and described in connection with FIG. 3, above. For example, customer premise equipment at the homes 412 may include devices having a transmitter 308, a receiver 304, and/or a network interface (e.g., to communicate with an access point or other device to receive information from the fiber node 410 or similar device). Moreover, the devices at the customer premise equipment may include volatile memory 322 and/or non-volatile memory 324 in addition to a processor (e.g., to perform one or more computational tasks, such as processing received signals, etc.). Further, the customer premise equipment may include a display 316 and/or a keypad 318 (e.g., for interacting with a user or operator).

Figure 5:
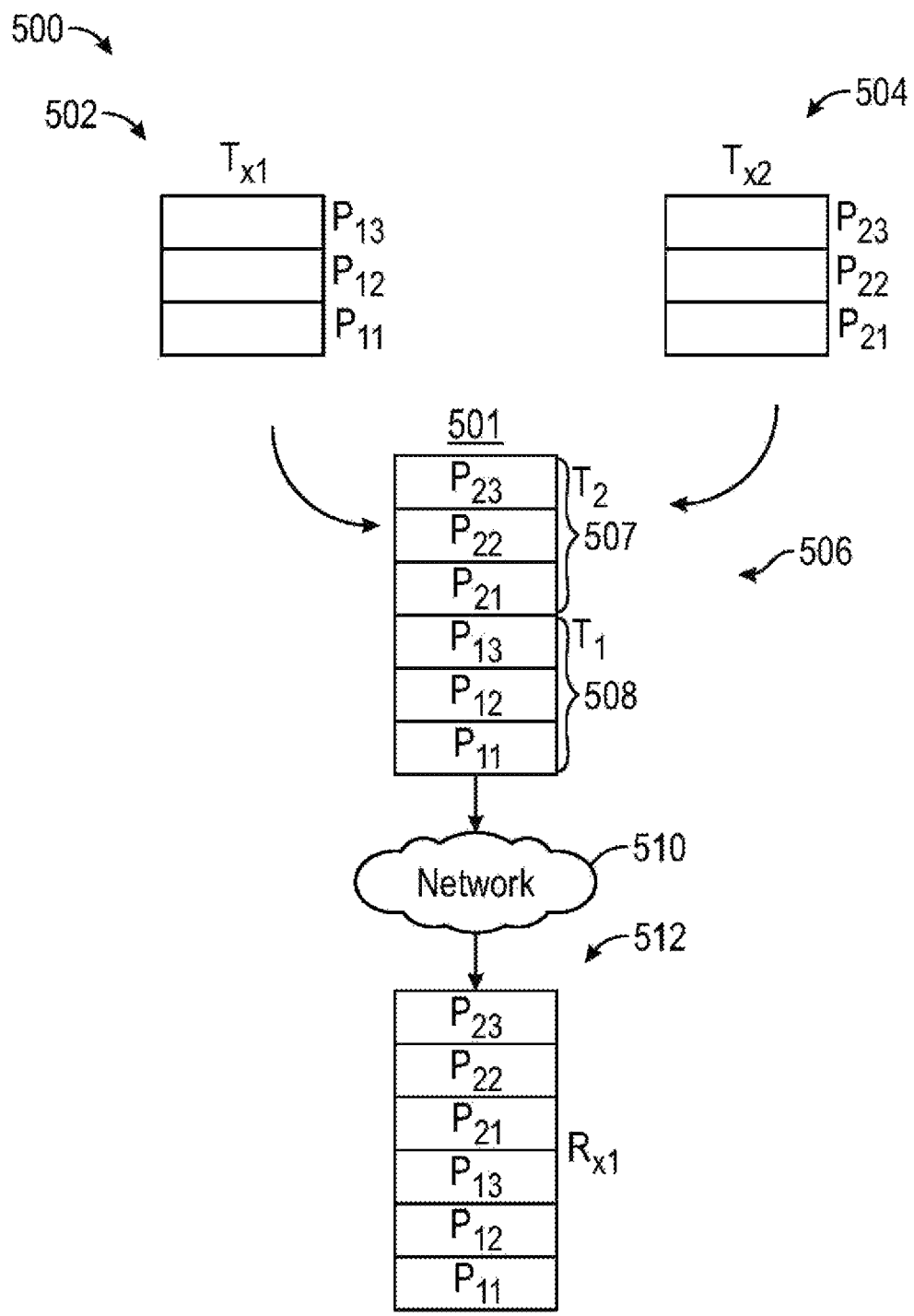
FIG. 5 shows an example diagram of a scheduler that can be used for the scheduling of data packets over a network having a variety of media types (e.g., wired or wireless media), in accordance with example embodiments of the disclosure.

FIG. 5 shows an example diagram 500 of a scheduler 501 that can be used for the scheduling of data packets corresponding to a variety of media (e.g., WiFi, ethernet, etc.) types, in accordance with example embodiments of the disclosure. In another aspect, the scheduler 501 may operate on one more devices (e.g., devices shown and described in connection with FIG. 4, above). In some embodiments, a scheduler 501 can refer to an arbiter on a node in packet switching communication network, such as a cable or wireless network. In another aspect, the scheduler 501 can manage the sequence of network packets in the transmit and receive queues of the network interface controller (not shown). In some embodiments, the scheduler 501 may determine what packets to forward to another device or component of a device next. The scheduler 501 may be associated with a queuing system, storing the network packets temporarily until they are transmitted. As will be elaborated on below, a system may have multiple queues that may hold the packets of one flow, classification, or priority. In some cases, it may not be possible to schedule all of the transmissions within the constraints of the system. In these cases, the scheduler 501 may determine which packets to forward and what packets gets dropped. In some embodiments, the scheduler 501 may aim at one or more of many goals, for example: maximizing throughput (the total amount of work completed per time unit); minimizing wait time (time from work becoming enabled until the first point it begins execution on resources); minimizing latency or response time (time from work becoming enabled until it is finished.

Further, as described in detail below, diagram generally shows receive buffers and transmit buffers that may be work in conjunction with the disclosed scheduler. In some aspects, the term buffer and the term queue may be used interchangeably herein. In some embodiments, incoming packets from various devices may be stored at respective buffers. As the device receives packets, the packets may be buffered in the receive buffers; further the device may queue the packets for transmission in a transmission buffer, and transmit the packets to a second device over a network. The queuing of the packets may be performed in a first-in first-out (FIFO) manner, or via other suitable methods. In some embodiments, this process can lead to large buffers, and the dropping of packets.

In particular, diagram 500 depicts initial devices (e.g., CMTS's, servers, other mobile devices, etc.) such as device 502 and device 504 that have packets to transmit. For example, device 502 may have packets p11, p12, and p13 to transmit, while device 504 may have packets p21, p22, and p23 to transmit. In some embodiments, additional devices may have packets to transmit as well, but are not shown for the sake of simplicity. In some embodiments, devices 502 and 504 may have packets of different priorities (e.g., real time and non-real time data) and may be attempting to transmit them at substantially the same time. In some embodiments, the scheduler 501, upon detecting the request to transmit by the devices 502 and 504, may use packet buffering techniques in its transmission buffer 506. In some embodiments, such a scheduler 501 may arrange the data packets from the different devices 502 and 504 include a first-in-first-out (FIFO) queue and/or buffer. That is, as packets are inputted to the scheduler 501 from the devices 502 and 504, the packets may be saved for transmission at an available opportunity; however, this may lead to the generation of large buffers and queues, such as in the transmission buffer 506. In particular, the transmission buffer 506 may buffer the packets corresponding to device 502 and packets corresponding to device 504 in successive order, for example, in blocks 507 and 508. Accordingly, when a given device (e.g., device 502) has a packet of high priority (which can be transmitted even during an active transmission of a data stream, for example, by using an interleaver, not shown), the scheduler 501 may first need to at least partially flush out the buffer 506 before being able to transmit such a packet.

Moreover, before the scheduler 501 can queue up the high-priority packets in the transmit buffer 506 for faster transmission once the packets are in the interleaver, the scheduler 501 may need to clear the interleaver. Further, packets may be further delayed depending on the depth of the interleaver and the depth of the buffer 506 (e.g., the number of packets that the interleaver and/or buffer 506 can store), particularly for high priority packets. For example, for an interleaver depth of 128 packets, the scheduler 501 may need to clear 128 packets before the scheduler 501 can reload the interleaver. In some embodiments, the disclosed scheduler 501 may avoid the delays caused by this buffer bloat. In some embodiments, the scheduler 501 may use other scheduling algorithms such as weighted fair queuing, round-robin, starvation mode (e.g., when the scheduler 501 starts running out of buffer space and begins exporting packets to make room). Further, more intelligent algorithms can include red, blue, stochastic fair blue algorithms. This may serve to increase the rate of data packet transmission from the buffer 506 to another device 512 over a network 510.

In various aspects, the scheduler 501 may be configured to operate on one or more devices (e.g., device 404 which may include a CMTS, or another network controller device further upstream on the network 510) may include aspects of the functionality of the management computing entity 100, as shown and described in connection with FIGS. 1-2, above. In particular, the one or more devices may include or be in communication with one or more processing elements 205, memory 210, volatile memory 215, and may include a communication interface 220 (e.g., to communicate with between each other and with various customer premise equipment such as cable modems).

Figure 6:
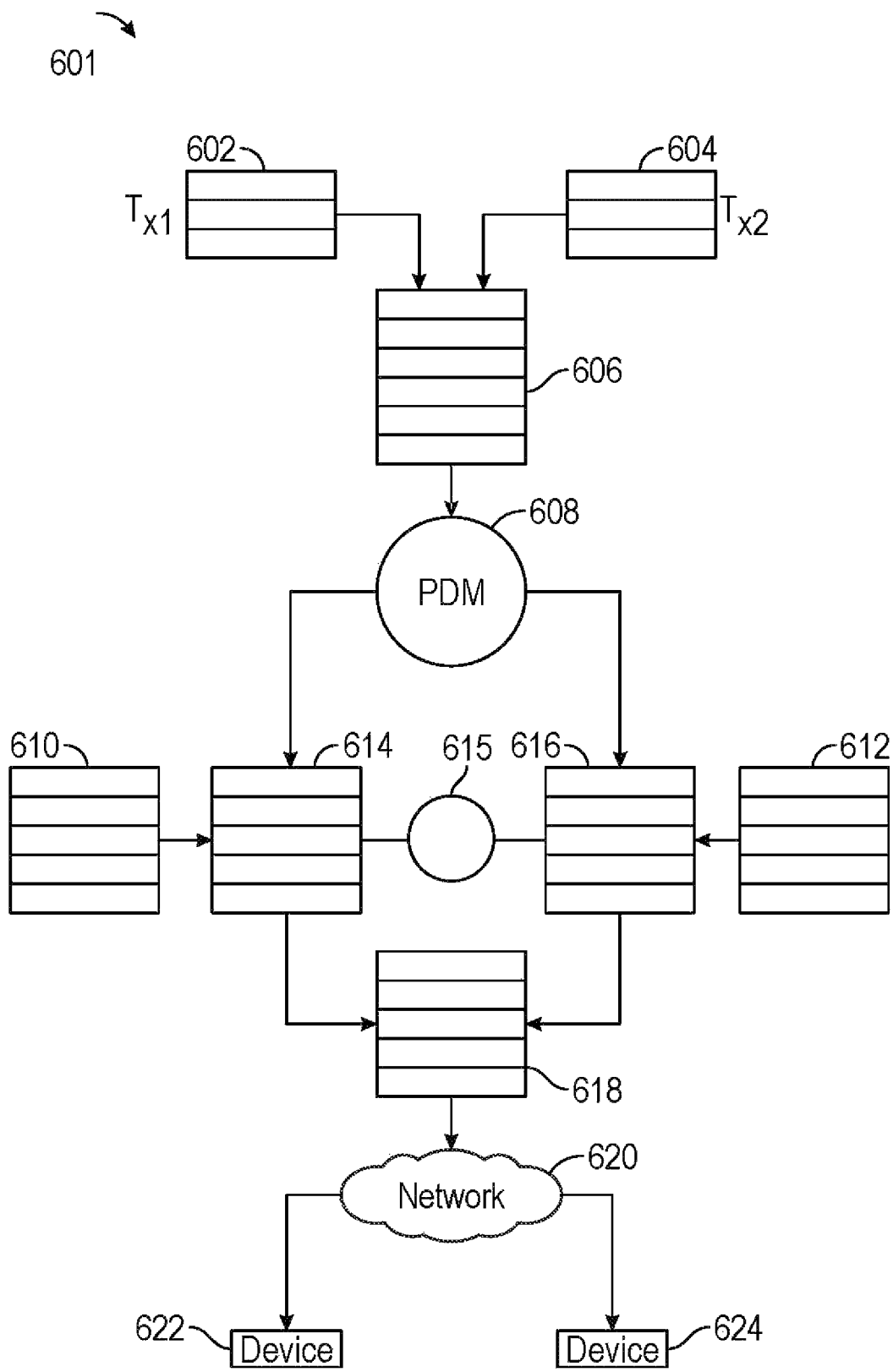
FIG. 6 shows another diagram of a scheduler and associated operations, in accordance with example embodiments of the disclosure.

FIG. 6 shows another diagram of a scheduler and associated operations, in accordance with example embodiments of the disclosure. In some embodiments, the diagram shows a communication path and transmission method for the scheduler 601 implementing a first transmission buffer associated with non-real time data and real-time data. In some embodiments, the scheduler 601 can determine (for example, using a priority determination module, PDM 608) whether incoming first packets 602 corresponding to first transmitter and a second packets 604 corresponding to second transmitter (and stored initially at a receiving buffer 606) are real-time or non-real time packets (e.g., packets associated with low-latency applications such as video or audio, or packets associated with email, text, other discard-eligible packets, or the like). In some embodiments, the scheduler 601 may, in association with the PDM 608, determine the real time and non-real time nature of the scheduler 601 read a header associated with received packets, for example, header indicative of a differential service code point (DSCP) which can be used to determine the traffic nature of the packet. In some embodiments, the scheduler 601 can, in association with the PDM 608, determine the priority of the packets by analyzing the priority of the packets encoded in an eight-layer priority scheme, for example, in the header of the packets. In this scheme, the priorities may be labeled from zero through seven. In some embodiments, priorities of zero through three may refer to the priorities of non-real time traffic, whereas priorities of one through seven may refer to the priorities of real-time traffic. In some embodiments, the scheduler 601 can, after determining the priority of the packets, generate two different buffers and/or queues: a real-time packet buffer and/or queue 610 and a non-real time buffer and/or queue 612, which may correspond to the real-time and non-real time packets. Moreover, within the two queues, various scheduling algorithms (e.g., weighted fair queue, round-robin, etc.) can be implemented at the operational level of the real-time packet buffer and/or queue 610 and the non-real time buffer and/or queue 612 to determine the further propagation of the packets in the system, for example, to real-time and/or non-real time re-transmission buffers, to be described below.

As noted, in various aspects, the scheduler 601 may increase device transmission and reception frequency, increase network throughput, and decrease error rates in the network 620. The scheduler 601 may provide such advantages in part by implementing re-transmission buffers, which may include a real-time re-transmission buffer 614 and a non-real time re-transmission buffer 616. In another aspect, the real time and non-real time data packets can be moved from real time transmission queue 610 and non-real time transmission queue 612 to the corresponding re-transmission buffers (real time re-transmission queue 614 and non-real transmission queue 616) after the packets have been sorted by the scheduler (e.g., to determine the traffic type of the packets). In another aspect, the moving of the packets to the retransmission buffers may free up various internal holding buffers of the system (such as the receive buffer used by the receiving device), and allow for more packets to be received and processed by the scheduler 601.

In an aspect, the packets can be moved from the re-transmission buffers 614 and 616 to a transmission queue and/or buffer 618 using any suitable algorithm or technique, for example, using a round-robin method, weighted fair queue, or the like. Further, if the scheduler 601 determines that a re-transmission of the packets is needed (e.g., in the case of packet loss over the network, such as network 620), the scheduler 601 can feed such packets (or copies of such packets) to be re-transmitted from the corresponding re-transmission buffers (e.g., real time re-transmission buffer 614 or non-real time re-transmission buffer 616) from a device that the scheduler is implemented on to other devices (e.g., devices 622 and/or 624), rather than escalating the re-transmit request and processing back up to the original transmitting device's scheduler (e.g., an original CMTS device or intermediate node between the source device and the destination device).

In some embodiments, the scheduler 601 may further include a computing unit 615 that may store and direct information and instructions associated with the packets. For example, the real time re-transmission buffer 614 and the non-real time retransmission buffer 616 can maintain the packets in memory until a timer (e.g., a back off timer implemented in the computing unit 615) expires. In some embodiments, if the timer goes off and the scheduler 601 does not receive an acknowledgement from a targeted receiving device (e.g., device 622 and/or device 624) in a predetermined time-window (e.g., a window size corresponding to a 64 packet or 64 kilobits of information), the scheduler 601 can trigger a re-transmission of the packets from the transmitting device (e.g., from the re-transmission buffers 614 and 616) rather than from a previous device (not shown) or from the original receiving buffer 606.

In some aspects, the computing unit 615 may use artificial intelligence (AI), to determine the routing of the packets between the various buffers), for example, by monitoring data flow over different buffers in time (e.g., historical data) for enhanced data forwarding. Accordingly, embodiments of devices, scheduler, and/or related components described herein can employ AI to facilitate automating one or more features described herein. The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

In some aspects, the scheduler 601 may be implemented in any suitable network 620 (e.g., a wired network or a wireless network). In some embodiments, the network 620 may include a portion of a cable network. As discussed in connection with FIG. 4 and corresponding description, the cable network may include, at one end, a computer, a cable modem, and a CMTS that may transmit at least partially over the Internet. Further, the network 620 may include a router at the other end to a server. In some embodiments, the scheduler 601 may work with any of the devices, or a subset of devices between an originating device (also referred to herein as a source device) and a destination device such as devices 622 and 624. That is, in some aspects, the scheduler 601 may be configured to work with any subset of devices between the CMTS and the router at the other end of the network. In an aspect, depending on whether a given device is receiving data a or transmitting data, the device may be referred to as a receiver or a receiving device (transmitting device or transmitter) the other device may be referred to as a transmitter or transmitting device (receiver or receiving device).

In some aspects, wireless networks as used herein may include communication that can operate in accordance with various standards such as Institute of Electrical and Electronics Engineers (IEEE) 802.11x, Bluetooth, global system for mobile communications (GSM), code division multiple access (CDMA), third generation partnership project (3GPP), 5th generation wireless systems (5 G), and IEEE 802.11. Wireless networks based on the IEEE 802.11 wireless radio local area network (RLAN) standard, commercially known as WiFi®, Wi-Fi or WiFi, had led to availability of wireless devices and chipsets implementing various aspects of the IEEE 802.11 standards.

In some embodiments, the scheduler 601 may buffer data packets to be transmitted appropriately using the disclosed receiving buffer 606, the real time transmission buffer 610, the non-real time transmission buffer 616, the re-transmission buffer 614 and the non-real time retransmission buffer 616, and a transmit buffer 618. In some aspects, packets may be lost or corrupted anywhere along the devices of the network 620. In particular, a high loss network (e.g., a Wi-Fi or a cellular network) may lead to high packet loss rates via data collisions on a transmitting medium, noise on the transmission medium, and the like. Accordingly, in some embodiments, the scheduler 601 in association with the computing unit 615 may queue a packet for transmission from the transmission buffer 618 and, after transmitting a block of frames corresponding to the data packet, activate a timer. In another aspect, the timer may activate a timeout window, which may have a duration from approximately milliseconds to approximately seconds. Accordingly, before a lack of acknowledgement is determined by the scheduler 601, and before the data transmission is escalated to an ultimate end point device (e.g., a source transmitter such as a CMTS) on the network 620 (e.g., a cable network), the scheduler 601 may take other appropriate actions to attempt a redelivery of the data packets. For example, if the scheduler 601 does not receive an acknowledgement from a receiving device (e.g., device 622 and/or 624) within the timeout window, the scheduler 601 may configure transmitting device to either send a not-acknowledged (NACK) message to the receiving device (e.g., device 622 and/or 624) or the transmitting device may let the timer timeout, which may allow the scheduler 601 to configure the transmitting device to re-transmit the packet to the receiving device (e.g., device 622 and/or 624). In some aspects, the scheduler may, in association with a combining component, interleave at least one non-real time packet from the non-real time re-transmission buffer with one or more real-time packets from the first re-transmission buffer based on a predetermined rule. The predetermined rule indicates the ratio of non-real time packets to real-time packets to be transmitted per cycle.

As noted, the scheduler 601 can configure the transmitting device to then re-transmit the data packets to a receiving device, rather than escalating the failed data packet and associated control messages back to the network endpoint device (not shown) and waiting for all of additional timers of intervening devices to timeout (thereby leading to buffer bloat). In an embodiment, the scheduler 601 can more directly transmit the data from the transmit buffer 618 to a receiving device from the re-transmission buffers 616 and 616. Moreover, since the scheduler 601 has the packets already queued and ready for transmission in the re-transmission buffers, the scheduler 601 may configure the device to re-transmit the data directly from the re-transmission buffers and thereby avoid additional network transit and associated delays on the network 620.

As noted, a prioritization determination module (PDM, such as PDM 608) may be used by the scheduler to determine whether the data packets should be transmitted from the real-time buffer or the non-real time buffer. Further, by having the buffers (e.g., real time and non-real time) communicating with the PDM and/or computing unit rather than the original transmitting endpoint device (e.g., original server or CMTS) on the network or the transmitting device at a higher level than the software layer of the scheduler, the data throughput and network efficiency can be increased.

Further, by dividing the data for transmission to two different queues (e.g., a real-time queue and a non-real time queue), the PDM can make a decision related to two queues rather than a higher number of queues (e.g., eight queues) relating to differential data priority, thereby saving computing resources. In some embodiments, the PDM can be used to transmit non-real time even when the real time buffer is not cleared. This may be useful for devices having non-real time packets that need to transmit data urgently. Accordingly, a scheduling algorithm can be used at the PDM level, which can permit a transmission method to allow a predetermined number of packets (e.g., 20 packets) of real times data before allowing one non-real time packet of data. Alternatively or additionally, the PDM may allow packets to be waiting in the non-real time queue for a predetermined time (e.g., 100 milliseconds) before the PDM allows some of the non-real time packets to be transmitted. Other similar techniques for scheduling can be used by the PDM to send a portion of the non-real time data and the real-time data together by the transmitting device. Accordingly, the scheduler, in part by using the PDM, may pre-stage the transmission queue and/or buffer, thereby preventing a situation where the transmitting device attempts to fill the transmitted queue and/or buffer itself, which can lead to buffer backup and a corresponding reduction in transmission efficiency.

As previously noted, buffer bloat can cause many delays in the network 620 (e.g., in wireless networks). For example, when a user uses their cell phone to surf on the web, webpages may load slowly. This may due to the fact that the network 620 is congested and/or lossy. Further, any intermediate nodes of the network 620 may experience packet losses. Accordingly, even if a connection from the original transmitting device (e.g., a server on having the data being transmitted) is faithfully transmitted all from the initial node (e.g., a server) down to the wireless transmitter (e.g., last mile node), one or more transmitting devices on the cellular network may have a lot of interference. Accordingly, if the last wireless transmitter does not receive the data within a specified window, the timer of the last wireless transmitter may time out. Further, the original transmitting device may never receive an acknowledgement and therefore the original transmitting endpoint device may transmit the data over the network again and through several devices on the network 620. After several re-transmissions that are not successful (e.g., do not lead to the detection of an acknowledgement message), the original transmitting endpoint device to cut its window size in half, and thereby transmit twice as much data in the same time period. If the original transmitting endpoint device does not receive an acknowledgement after the first halving of the window, the original transmitting endpoint device can halve the transmitting window in half again. The original transmitting endpoint device can continue to halve the window in half until the window is down to a single packet duration. This may mean that every intermediate device may need to acknowledge each packet being transmitted. Such a mechanism can be referred to generally as an exponential backoff scheme.

In some embodiments, the disclosure describes a scheduler (e.g., scheduler 601) that can be implemented on one or more devices between endpoints (e.g., between a mobile device and/or wireless transmitter and an original transmitting endpoint device such as a server having website content. Each intermediate device (e.g., devices between endpoints) can implement a scheduler (e.g., a transmit scheduler and a receive scheduler depending on the device operating in a receiving mode of operation or a transmission mode of operation). For example, the scheduler may include transmit scheduler that may be responsible for scheduling downstream transmissions. The scheduler may include receive scheduler that may be responsible for scheduling upstream transmissions. In some embodiments, when an acknowledgement message is sent to a given intermediate device on the network, the given intermediate device having a scheduler configured to implement the scheduling functionality described herein, may re-transmit the data packets by effectively flushing the data out of the re-transmission buffers (e.g., similar to real time re-transmission buffer 614 and non-real time re-transmission buffer 616) to the transmit buffer (e.g., similar to transmit buffer 618).

In some aspects, other intermediate devices (intermediate routers, hubs, cell-towers, etc.) on the network between a device on which the scheduler operates and the original transmitting endpoint device (e.g., a server or a CMTS) may never receive an acknowledgement message, and may have timers that time-out accordingly. In some embodiments, the original transmitting endpoint device may have a first time out (e.g., a ten second timeout), and the various intermediate devices between the original transmitting endpoint device and the wireless transmitter may implement additional timeout periods for their respective timers, thereby causing transmission delays on the network, which may be addressed by aspects of the disclosed functionality of the scheduler which may be configured to operate on one or more devices on the network between the source and endpoint device.

In some embodiments, the scheduler (e.g. similar to scheduler 601) may route data on the network using header information associated with the data packets. The header information may include source device and destination device addresses (e.g., MAC addresses or IP addresses), one or more flow identifiers, and/or service-types for the data packets. Moreover, the scheduler may use a round-robin or similar algorithm when the scheduler implements more than one (e.g., two) re-transmission buffers and/or queues (e.g. similar to retransmission buffers 614 and/or 616) in order to determine which re-transmission buffer (e.g., real time or non-real time re-transmission buffer) to send the data packets from.

In some embodiments, the computing unit 615 may be configured such that scheduler 601 does not attempt to transmit data from the non-real time transmission buffer until the real time data buffer has had a chance to perform needed transmissions. For example, the non-real time transmission buffer may indicate to the scheduler in association with the computing unit (e.g., similar to computing unit 615) that the non-real time buffer has data to send; meanwhile, the real-time buffer may also indicate to the scheduler 601 in association with that it has data to send as well, and to therefore hold transmission until further notice.

In some embodiments, a software upgrade may be sent to one or more devices on the network (e.g., devices between the endpoints of the network) to implement the scheduler 601 in software. In other embodiments, the scheduler can be implemented using a dedicated chip, for example, to improve latency and reduce computational delays associated with running the scheduling algorithm.

In some embodiments, the scheduler 601 can determine that the device on which it is implemented is operating in a lossy network, for example, by monitoring network conditions. For example, the scheduler 601 may determine that it is obtaining multiplied timeouts over a predetermined time interval. The scheduler 601 can then use a protocol or algorithm, such as explicit congestion notification (ECN), to send a message to the original transmitting device on the network (e.g., a CMTS or server) to slow the transmission of information downstream. This added functionality can be performed by the scheduler 601 without forcing the original transmitting device to determine that one or more intermediate devices between the original transmitter and the destination devices are not receiving acknowledgements (e.g., using window acknowledgements). In another aspect, such techniques may allow the scheduler 601 to more efficiently transmit real time packets over the network (e.g., by using the real-time queues and/or buffers in addition to the non-real time buffers and/or queues and the re-transmission buffers). Further, in some aspects, the scheduler 601 can interleave non-real time along with the real time packets.

In some embodiments, the scheduler 601 may use a queue depth associated with the real-time queues, to make the determinations as to how the scheduler 601 can interleave non-real time along with the real time packets in one or more queues and/or buffers associated with the scheduler. In some embodiments, the queue depth can refer to how many packets are queued up either in the re-transmission queues and/or buffer, in the holding queue and/or buffer, or in the transmit queue.

In some embodiments, the various queues and/or buffers described herein, including, but not limited to, the retransmission queues and/or buffers, the transmit queues and/or buffers, the real-time queues and/or buffers, the non-real time queues and/or buffers, and associated controllers (e.g., the priority determination unit and/or other controllers) can use a variety of algorithms and techniques to determine what packets to send to another queue and/or buffer or another device. Non-limiting examples of such algorithms and techniques can include, but not be limited to: adaptive virtual queue, class-based queueing discipline, choose and keep for responsive flows, choose and kill for unresponsive flows (which can be a variant of random early detection, RED), controlled delay, and fair/flow queue controlled delay, credit-based fair queuing, deficit round robin, FavourQueue, generic cell rate algorithm, heavy-hitter filter, hierarchical fair-service curve, hierarchical token bucket, quick fair queueing, fair queuing and weighted fair queuing, first in, first out algorithms, fair queue packet scheduling, proportional integral controller enhanced, random early detection, advanced random early detection, generalized random early detection), robust random early detection, weighted random early detection, round-robin and weighted round robin, stochastic fair blue, resilient stochastic fair blue, stochastic fairness queuing, token bucket filter, trivial link equalizer, and/or any combination of the above.

In some embodiments, the scheduler and associated algorithms can be implemented on one or more processor and memory used in connection with an access point on a wireless network. In some aspects, a controller can use multiple access protocols in connection with the DOSCIS MAC packet scheduling to reduce network congestion. In some embodiments, the controller can use, for example, carrier-sense multiple access with collision avoidance (CSMA/CA) (for example, used in connection with IEEE 802.11/WiFi wireless local area networks, WLANs), ALOHA, slotted ALOHA, dynamic time-division multiple access (TDMA), reservation ALOHA (R-ALOHA), mobile slotted aloha (MS-ALOHA), code-division multiple access (CDMA), orthogonal frequency-division multiple access (OFDMA), and/or orthogonal frequency-division multiplexing (OFDM), and the like.

As mentioned, in some embodiments, the scheduler may implement a scheduler algorithm. In some aspects, scheduler algorithms can be used in connection with the WiFi DOCSIS MAC packet scheduler, for example, to reduce network congestion. In one embodiment, the scheduler algorithms can include a random early detection (RED) algorithm, also known as random early discard algorithm or random early drop algorithm for congestion avoidance. In some embodiments, RED can monitor the average queue size and drops (or marks) packets based on statistical probabilities. In some embodiments, if a buffer associated with one or more devices (for example, APs or STAs) is almost empty, then all incoming packets are accepted. As the queue grows, the probability for dropping an incoming packet can grow. When the buffer is full, the probability has reached 1 and all incoming packets may be dropped.

In one embodiment, the scheduler algorithms can include a weighted random early detection (WRED) algorithm to reduce network congestion. In some embodiments, WRED can refer to an extension of random early detection (RED) where a single queue may have several different sets of queue thresholds. Each threshold set can be associated with a particular traffic class. For example, a queue may have lower thresholds for lower priority packet. A queue buildup can cause the lower priority packets to be dropped, hence maintaining the higher priority packets in the same queue. In this way quality of service prioritization can be enabled for higher priority packets from a pool of packets using the same buffer.

In one embodiment, the scheduler algorithms can include an adaptive RED or active RED (ARED) algorithm, which can infer whether to make RED more or less aggressive based on the observation of the average queue length. In some embodiments, if the average queue length oscillates around a minimum threshold then early detection may be determined to be too aggressive. In another embodiment, if the average queue length oscillates around a maximum threshold then early detection may be determined to be too conservative. In some embodiments, the algorithm can change the probability according to how aggressively the algorithm determines it has been discarding traffic.

In one embodiment, the scheduler algorithms can include a robust random early detection (RRED) algorithm, for example, to improve the TCP throughput against Denial-of-Service (DoS) attacks. In some embodiments, a detection and filter block can be added in front of a regular RED block on a router. In some embodiments, the system can detect and filter out a DoS attack packets from incoming flows before they feed to the RED algorithm.

In one embodiment, the scheduler algorithms can include a blue algorithm. Like RED, blue can operate by randomly dropping or marking packet with explicit congestion notification mark before the transmit buffer of the network interface controller overflows. Unlike RED, however, it may need little or no tuning to be performed by the network administrator. A Blue queue can maintain a drop/mark probability and drops/marks packets with the drop/mark probability as they enter the queue. Whenever the queue overflows, the drop/mark probability can be increased by a small constant, and whenever the queue is empty, the drop/mark probability can be decreased by another constant. In some embodiments, the drop/mark probability can converge to a value that keeps the queue within its bounds with full link utilization.

In various aspects, the scheduler 601 may be configured to operate on one or more devices (e.g., device 404 which may include a CMTS, or another network controller device further upstream on the network 510) may include aspects of the functionality of the management computing entity 100, as shown and described in connection with FIGS. 1-2, above. In particular, the one or more devices may include or be in communication with one or more processing elements 205, memory 210, volatile memory 215, and may include a communication interface 220 (e.g., to communicate with between each other and with various customer premise equipment such as cable modems).

Moreover, the scheduler 601 may be configured to transmit data packets to customer premise equipment, which may include devices that include aspects of the functionality of the user device 110, as further shown and described in connection with FIG. 3, above. For example, customer premise equipment may include a device having a transmitter 308, a receiver 304, and/or a network interface (e.g., to communicate with an access point or other device to receive information from the fiber node 410 or similar device). Moreover, the customer premise equipment may include a device having volatile memory 322 and/or non-volatile memory 324 in addition to a processor (e.g., to perform one or more computational tasks, such as processing received signals, etc.). Further, the customer premise equipment may include a display 316 and/or a keypad 318 (e.g., for interacting with a user or operator).

Figure 7:
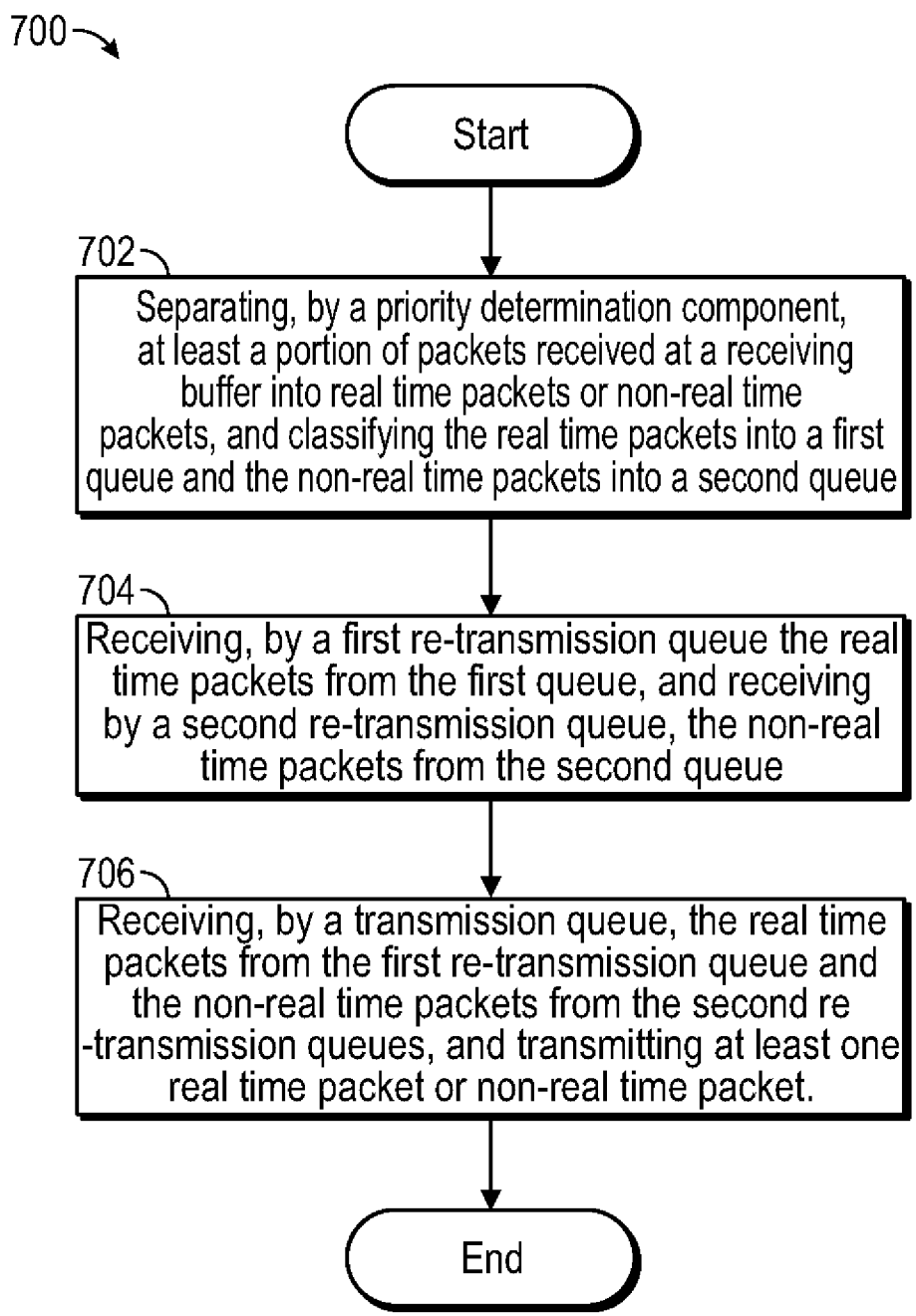
FIG. 7 shows a diagram of an example flowchart for operating the scheduler and example devices on the networks described herein, in accordance with example embodiments of the disclosure.

FIG. 7 shows another diagram 700 of an example flowchart for operating the example devices and cable networks described herein, in accordance with example embodiments of the disclosure. At block 702, a priority determination component (PDM, for example, PDM of a scheduler) may separate at least a portion of packets received at a receiving buffer into real time packets or non-real time packets, and may classify the real time packets into a first queue and the non-real time packets into a second queue. Further, by having the buffers (e.g., real time and non-real time) communicating with the PDM and/or computing unit rather than the original transmitting endpoint device (e.g., original server or CMTS) on the network or the transmitting device at a higher level than the software layer of the scheduler, the data throughput and network efficiency can be increased.

Further, by dividing the data for transmission to two different queues (e.g., a real-time queue and a non-real time queue), the PDM can make a decision related to two queues rather than a higher number of queues (e.g., eight queues) relating to differential data priority, thereby saving computing resources. In some embodiments, the PDM can be used to transmit non-real time even when the real time buffer is not cleared. This may be useful for devices having non-real time packets that need to transmit data urgently. Accordingly, a scheduling algorithm can be used at the PDM level, which can permit a transmission method to allow a predetermined number of packets (e.g., 20 packets) of real times data before allowing one non-real time packet of data. Alternatively or additionally, the PDM may allow packets to be waiting in the non-real time queue for a predetermined time (e.g., 100 milliseconds) before the PDM allows some of the non-real time packets to be transmitted. Other similar techniques for scheduling can be used by the PDM to send a portion of the non-real time data and the real-time data together by the transmitting device. Accordingly, the scheduler, in part by using the PDM, may pre-stage the transmission queue and/or buffer, thereby preventing a situation where the transmitting device attempts to fill the transmitted queue and/or buffer itself, which can lead to buffer backup and a corresponding reduction in transmission efficiency.

At block 704, a first re-transmission queue (e.g., a re-transmission queue of a scheduler) may receive the real time packets from the first queue. Further a second re-transmission queue may receive the non-real time packets from the second queue, which may include a real-time re-transmission buffer and a non-real time re-transmission buffer. In another aspect, the real time and non-real time data packets can be moved from real time transmission queue and non-real time transmission queue to the corresponding re-transmission buffers after the packets have been sorted by the scheduler (e.g., to determine the traffic type of the packets). In another aspect, the moving of the packets to the retransmission buffers may free up various internal holding buffers of the system (such as the receive buffer used by the receiving device), and allow for more packets to be received and processed by the scheduler.

In an aspect, the packets can be moved from the re-transmission buffers to a transmission queue and/or buffer using any suitable algorithm or technique, for example, using a round-robin method, weighted fair queue, or the like. Further, if the scheduler determines that a re-transmission of the packets is needed (e.g., in the case of packet loss over the network, such as network), the scheduler can feed such packets (or copies of such packets) to be re-transmitted from the corresponding re-transmission buffers (e.g., real time re-transmission buffer or non-real time re-transmission buffer) from a device that the scheduler is implemented on to other devices, rather than escalating the re-transmit request and processing back up to the original transmitting device's scheduler (e.g., an original CMTS device or intermediate node between the source device and the destination device).

In some embodiments, the scheduler may further include a computing unit that may store and direct information and instructions associated with the packets. For example, the real time re-transmission buffer and the non-real time retransmission buffer can maintain the packets in memory until a timer (e.g., a back off timer implemented in the computing unit) expires. In some embodiments, if the timer goes off and the scheduler does not receive an acknowledgement from a targeted receiving device in a predetermined time-window (e.g., a window size corresponding to a 64 packet or 64 kilobits of information), the scheduler can trigger a re-transmission of the packets from the transmitting device (e.g., from the re-transmission buffers) rather than from a previous device (not shown) or from the original receiving buffer.

At block 706, a transmission queue (e.g., a transmission queue of a scheduler), may receive the real time packets from the first re-transmission queue and the non-real time packets from the second re-transmission queues. Further, the transmission queue may transit at least one real time packet or non-real time packet. As noted, the scheduler can configure the transmitting device to re-transmit the data packets to a receiving device in the event of packet loss, rather than escalating the failed data packet and associated control messages back to the network endpoint device and waiting for all of additional timers of intervening devices to timeout (thereby leading to buffer bloat). In an embodiment, the scheduler can more directly transmit the data from the transmit buffer to a receiving device from the re-transmission buffers. Moreover, since the scheduler has the packets already queued and ready for transmission in the re-transmission buffers, the scheduler may configure the device to re-transmit the data directly from the re-transmission buffers (through the transmission buffer) and thereby avoid additional network transit and associated delays on the network.

Figure 8:
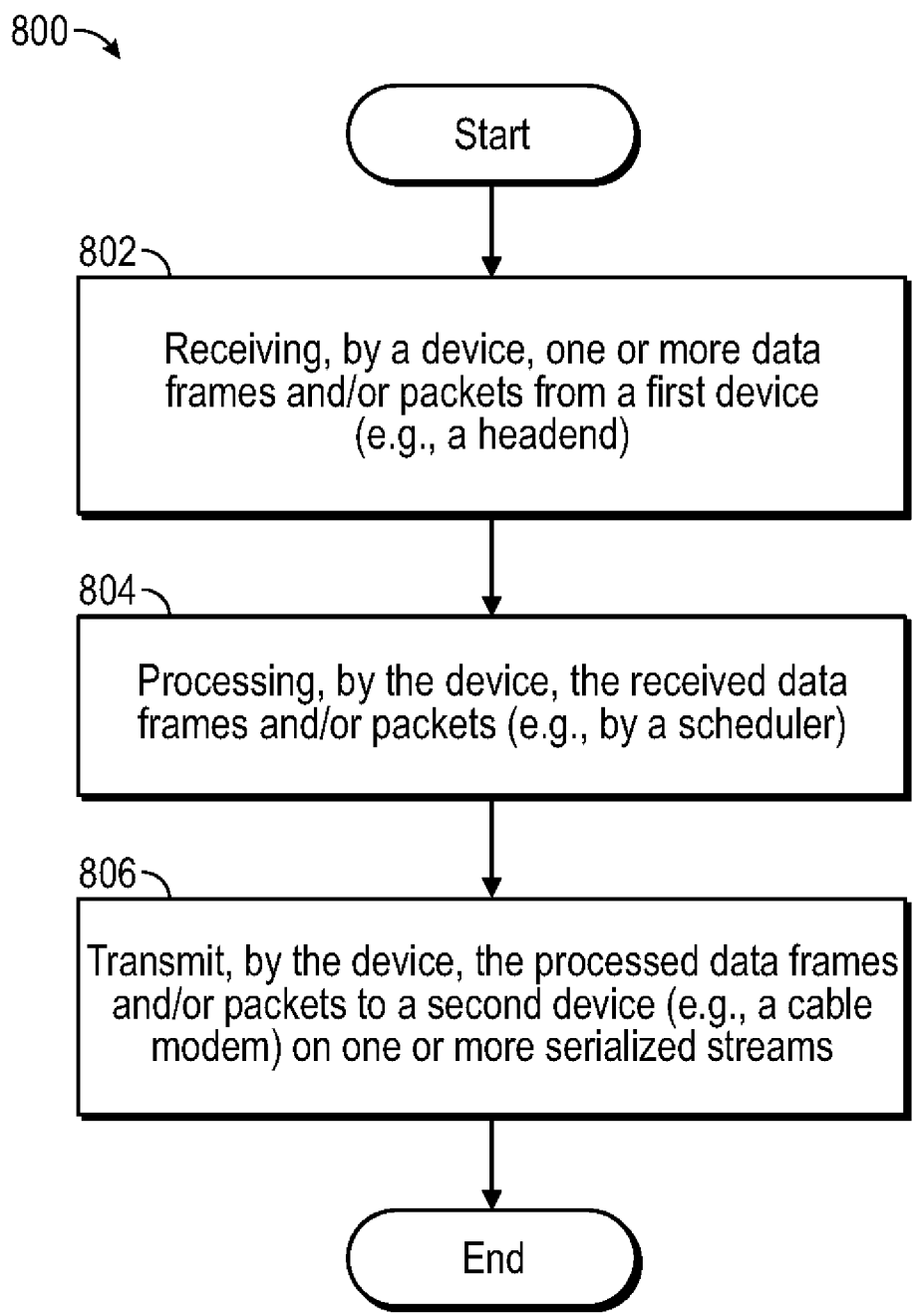
FIG. 8 shows a diagram of an example flowchart for operating the example devices on the networks described herein, in accordance with example embodiments of the disclosure.

FIG. 8 shows a diagram 800 of another example flowchart for operating example devices networks described herein, in accordance with example embodiments of the disclosure. The process 801 may begin with block 802, where a device (e.g., a CMTS or another device having medium access control (MAC) layer functionality) can receive one or more data frames and/or packets from a first device (for example a headend switch device).

The process 801 may continue with block 804, where the device can process the data frames and/or packets. In particular, the device processing the data frame and/or packets may include the use of a priority determination component (PDM, for example, PDM of a scheduler associated with the device), that may separate at least a portion of packets received at a receiving buffer into real time packets or non-real time packets, and may classify the real time packets into a first queue and the non-real time packets into a second queue. Moreover, the processing of the data frame and/or packets may include applying a scheduling algorithm at the PDM level, which can permit a transmission method to allow a predetermined number of packets (e.g., 20 packets) of real times data before allowing one non-real time packet of data. Further, the processing of the data frame and/or packets may include receiving, by a first re-transmission queue (e.g., a re-transmission queue of a scheduler), the real time packets from the first queue. Further a second re-transmission queue may receive the non-real time packets from the second queue, which may include a real-time re-transmission buffer and a non-real time re-transmission buffer. In another aspect, the real time and non-real time data packets can be moved from real time transmission queue and non-real time transmission queue to the corresponding re-transmission buffers after the packets have been sorted by the scheduler (e.g., to determine the traffic type of the packets). In another aspect, the processing of the data frame and/or packets may include receiving, by a transmission queue (e.g., a transmission queue of a scheduler), the real time packets from the first re-transmission queue and the non-real time packets from the second re-transmission queues.

In various aspects, the device can process the data frames and/or packets in order to perform various additional function (e.g., classify the data frames and/or packets into corresponding service flows (for example, using service flow IDs (SFIDs)), encapsulate data frames and/or packets (for example, into DOCSIS frames), determine routing information associated with the data frames and/or packets, determine resource allocation, scheduling, service flow, quality of service (QoS) on the data frames and/or packets.

Finally, the process 801 may end with block 806, where the device can transmit the processed data frames to a second device (for example, a cable modem device at a customer premise), for example, on one or more serialized streams.

IV. ADDITIONAL IMPLEMENTATION DETAILS

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an implementation of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

V. CONCLUSION

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A device including a scheduler, the scheduler including computer-executable instructions that can be executed by a processor operably coupled to memory, the scheduler comprising:
   a first queue configured to receive real-time packets and a second queue configured to receive non real-time packets;
   a first re-transmission queue configured to receive the real-time packets from the first queue and a second re-transmission configured to receive the non real-time packets from the second queue; and
   a transmitter configured to receive the real-time packets from the first re-transmission queue and the non real-time packets from the second re-transmission queue, transmit one or more real-time packets, and interleave one or more non-real time packets from the second re-transmission queue with one or more real-time packets from the first re-transmission queue based on a ratio of non-real time packets to real-time packets to be transmitted per cycle,
   wherein the device is configured to retain the real-time packets or non real-time packets unless the real-time packets or non real-time packets are marked as discard eligible, wherein the scheduler is configured to operate on one or more intermediate devices between a source transmitting node and a destination node.

2. The device of claim 1, wherein the first re-transmission queue receives the real-time packets from the first queue and the second re-transmission queue receives the non-real time packets from the second queue based on a first priority and a second priority associated with the real-time packets and the non-real time packets, respectively.

3. The device of claim 1, wherein a receiving buffer transmits packets to the first queue and second queue using a first-in first-out process.

4. The device of claim 1, wherein the transmitter transmits the one or more real-time packets or non-real time packet using a round-robin protocol.

5. The device of claim 1, wherein the source transmitting node includes a cable modem termination system and the destination node includes a user device.

6. A computer-implemented method, comprising:
separating, by a processor, at least a portion of packets received at a receiving buffer into real-time packets or non-real time packets, and transmitting the real-time packets into a first queue and the non-real time packets into a second queue;
receiving, by a first re-transmission queue, the real-time packets from the first queue;
receiving, by a second re-transmission queue, the non-real time packets from the second queue;
receiving, by a transmitter, the real-time packets from the first re-transmission queue and the non-real time packets from the second re-transmission queue; and
causing to transmit one or more real-time packets, and interleave one or more non-real time packets from the second re-transmission queue with the one or more real-time packets from the first re-transmission queue based on a ratio of non-real time packets to real-time packets to be transmitted per cycle,
wherein the real-time packets or non real-time packets are retained unless the real-time packets or non real-time packets are marked as discard eligible, wherein the scheduler is configured to operate on one or more intermediate devices between a source transmitting node and a destination node.

7. The computer-implemented method of claim 6, wherein the first re-transmission queue receives the real-time packets from the first queue and the second re-transmission queue receives the non-real time packets from the second queue based on a first priority and a second priority associated with real-time packets and the non-real time packets, respectively.

8. The computer-implemented method of claim 6, wherein the receiving buffer transmits packets to the first queue and second queue using a first-in first-out process.

9. The computer-implemented method of claim 6, wherein the transmitter transmits the one or more real-time packets or non-real time packets using a round-robin protocol.

10. A computer-readable non-transitory storage medium for scheduling packets in a network, the computer-readable non-transitory storage medium having program instructions embodied therewith, the program instructions executable by a processor to cause the processor to:
separate at least a portion of packets received at a receiving buffer into real-time packets or non-real time packets, and transmitting the real-time packets into a first queue and the non-real time packets into a second queue;
receive at a first re-transmission queue, the real-time packets from the first queue, and receive by a second re-transmission queue, the non-real time packets from the second queue;
receive at a transmitter, the real-time packets from the first re-transmission queue and the non-real time packets from the second re-transmission queue; and
cause to transmit one or more real-time packets and interleave one or more non-real time packet from the second re-transmission queue with the one or more real-time packets from the first re-transmission queue based on a ratio of non-real time packets to real-time packets to be transmitted per cycle,
wherein the real-time packets or non real-time packets are retained unless the real-time packets or non real-time packets are marked as discard eligible, wherein the scheduler is configured to operate on one or more intermediate devices between a source transmitting node and a destination node.

11. The computer-readable non-transitory storage medium of claim 10, the program instructions executable by a processor to further cause the processor to determine, by the first re-transmission queue, real-time packets received from the first queue and determine, by the second re-transmission queue, the non-real time packets received from the second queue based on a first priority and a second priority associated with real-time packets and the non-real time packets, respectively.

12. The computer-readable non-transitory storage medium of claim 10, the program instructions executable by a processor to further cause the processor to transmits packets to the first queue and second queue using a first-in first-out process.

13. The computer-readable non-transitory storage medium of claim 10, the program instructions executable by a processor to further cause the processor to cause to transmit, by the transmitter, the one or more real-time packets or non-real time packets using a round-robin protocol.

* * * * *